United States Patent [19]

Gump

[11] 4,025,211
[45] May 24, 1977

[54] DRAW-TIGHT CONNECTOR

[76] Inventor: William E. Gump, 4311 SE. Belmont, Portland, Oreg. 97215

[22] Filed: Apr. 2, 1976

[21] Appl. No.: 672,866

[52] U.S. Cl. ............................. 403/361; 182/179; 403/49

[51] Int. Cl.² ..................................... B25G 3/02

[58] Field of Search .......... 403/231, 361, 373, 374, 403/403, 49, 167, 170, 171, 172, 176; 52/753 D, 753 C, 758 F, 753 F, 280, 288, 657; 182/179; 24/263 B, 263 LL

[56] References Cited

UNITED STATES PATENTS 1,076,838  10/1913  Okun ............................ 52/758 C

FOREIGN PATENTS OR APPLICATIONS 863,855  3/1961  United Kingdom ............... 182/179

Primary Examiner—Wayne L. Shedd
Attorney, Agent, or Firm—Adrian J. LaRue

[57] ABSTRACT

A draw-tight connector for connecting members extending at right angles with respect to each other includes a receptacle means provided on one of the members and a projection means having a configuration corresponding to the receptacle means and which is adapted to fit within the receptacle means. Means connect the receptacle means and projection means together thereby drawing them into tight engagement and connecting the members securely together.

4 Claims, 4 Drawing Figures

DRAW-TIGHT CONNECTOR

BACKGROUND OF THE INVENTION

Truck racks are used on pick-up trucks for carrying lumber, pipe, ladders and other kind of material and members. These racks can take various forms. One form is to weld the members that are to be used to construct the rack together. Such a rack is sturdy; however, it is expensive to make, and, when it is removed from the truck in order to use the truck for other uses, the rack cannot be easily stored. Another form is to use pipes which are threaded and connected together by pipe couplings; this is also sturdy, but like the welded version, it is expensive to make and it can be disassembled for storage but with time consuming effort which will also be required for reassembling the rack. Other forms can be visualized such as members loosely coupled together via couplings and pins for easy assembly and disassembly, but these are not too sturdy and there is a good deal of movement between the coupled members.

SUMMARY OF THE INVENTION

This invention relates to connector means and more particularly to draw-tight connector means that are secured onto members for maintaining such members in a tightly locking condition.

An object of the present invention is to provide draw-tight connector means including a receptacle means and a projection means that are to be secured onto respective members and for interengagement to connect the members together.

Another object of the present invention is the provision of draw-tight connector means having interconnecting members that are wedgingly secured together.

A further object of the present invention is to provide draw-tight connector means that includes members which are readily interconnected and tightly secured together and easily disconnected.

An additional object of the present invention is the provision of a draw-tight connector means having mating members that include inclined engaging surfaces for forcing engaging straight surfaces into frictional engagement under the influence of securing means thereby interconnecting members disposed at right angles.

These and other objects of the invention will appear more fully from the following description and the accompanying drawing illustrating a preferred embodiment of the invention. It is to be understood that changes may be made from the exact details shown and described without departing from the principles of the invention.

DETAILED DESCRIPTION OF THE INVENTION

Figure 1:
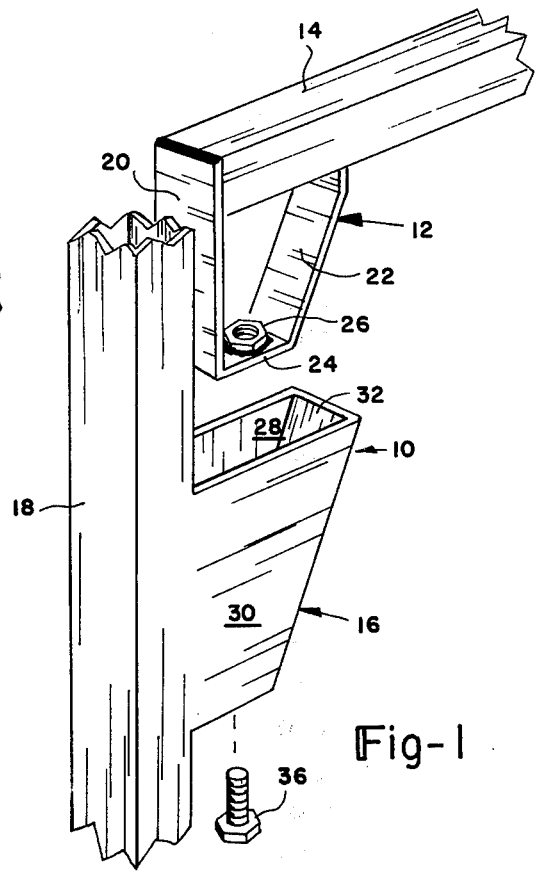
FIG. 1 is an exploded perspective view of receptacle means and projection means of a draw-tight connector means secured onto respective members to be interconnected by the draw-tight connector means.
Figure 2:
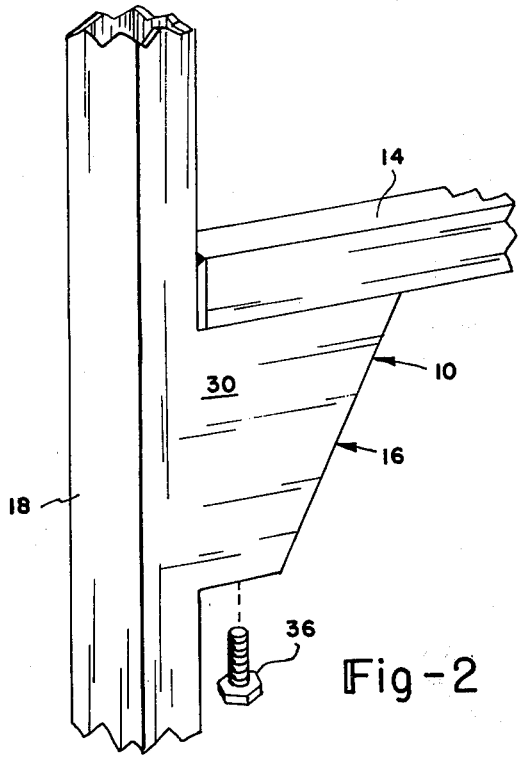
FIG. 2 is a view similar to FIG. 1 with the projection means positioned within the receptacle means.
Figure 3:
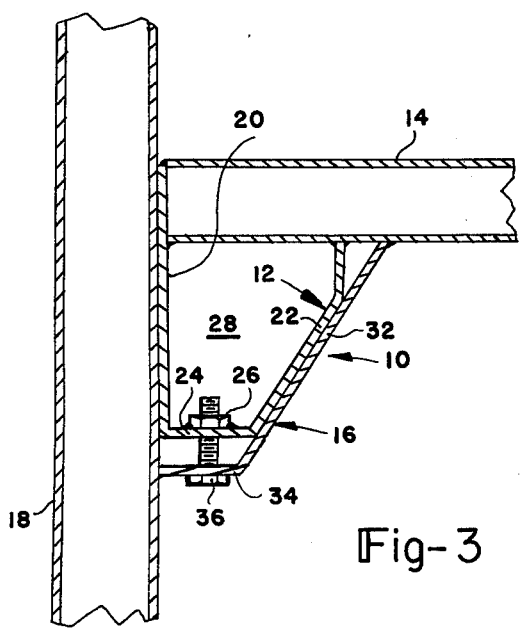
FIG. 3 is a cross-sectional view of FIG. 2 with the projection and receptacle means securingly wedged together.

The present invention will be described in conjunction with using the draw-tight connector means to securingly connect members together to form a truck rack for a pick-up truck, but it is to be understood that the draw-tight connector means can be used to construct other things such as, for example, storage racks, building components, trailer frames, fixed or portable guard railings, seat brackets, tables and any structural connection where high strength, ease of installation and portability may be required.

Turning now to the drawing, a draw-tight connector means 10 includes a projection means 12 secured onto member 14 and receptacle means 16 secured onto member 18. Projection means 12 is in the form of a wedge and includes a straight leg 20, and inclined leg 22 and a bight 24 interconnecting straight leg 20 and inclined leg 22. Legs 20 and 22 are secured onto member 14 as, for example, by welding. Bight 24 has a threaded nut 26 secured thereonto, also as, for example, by welding and its threaded opening is in alignment with a hole therein. Alternatively, the hole could be threaded instead of securing nut 26 to bight 24.

Receptacle means 16 has sides 28 and 30, and inclined member 32 and a bottom member 34. Sides 28 and 30 and bottom member 34 are secured to member 18 as, for example, by welding. Bottom member 34 is provided with a hole through which a bolt 36 extends for threaded engagement with nut 26 when projection means 12 is positioned within receptacle means 16.

In operation after projection means 12 has been secured onto member 14 and receptacle means 16 has been secured onto member 18, projection means 12 is positioned within receptacle means 16. Spacing between legs 20 and 22 is such that they engage member 18 and inclined member 32 therealong and bight 24 is spaced from bottom 34 a sufficient distance so that when bolt 36 in threadable engagement with nut 26 is tightened, projection means 12 is moved further into receptacle means 16 and in so doing leg 22 in sliding along inclined member 32 tightly forces leg 20 into frictional engagement with member 18 via wedging action thereby securing members 16 and 18 in a tightly-locked condition. This forms a very sturdy arrangement.

To disconnect projection means 12 and receptacle means 16 from each other, bolt 36 is threadably removed from nut 26 and member 14 is struck by a hammer or other article adjacent draw-tight connector means 10 to break the frictional connection between the projection means and receptacle means.

bolt 36 can be rotatably secured in the hole in bottom member 34 so as to preclude loss thereof when not in use.

Receptacle means 16 provides guide means to readily guide projection means 12 in position therein for quick assembly and when the draw-tight connector means are in a locked condition, the projection and receptacle means are protected from direct contact with the elements of inclement weather. If moisture does get into the locked connector means, drain holes can be provided in bottom member 34.

Figure 4:
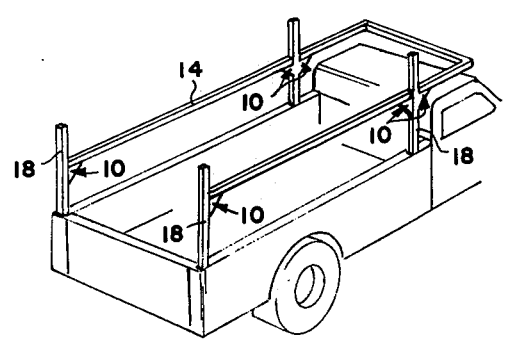
FIG. 4 shows a pick-up truck with members of a truck rack secured together via the draw-tight connector means of the present invention.

FIG. 4 illustrates the bed of a pick-up truck. Members 18 are the verticle posts that are positioned in the truck bed sides and members 14 are the horizontal members connected between members 18 via draw-tight connector means 10 in accordance with the present invention. As pointed out hereinabove, the draw-tight connector means can be used to construct a number of different things.

It can readily be discerned that there has been illustrated and described a draw-tight connection means that can be used to easily and quickly connect members securely together to form a sturdy structure and which enables easy disassembly when desired. Although the invention has been explained with reference to a particular embodiment, it is to be appreciated that various adaptations and modifications may be made without departing from the appended claims.

The invention is claimed in accordance with the following:

1. A draw-tight connector means for connecting members together, comprising:
   projection means including straight leg means, inclined leg means and bight means interconnecting said leg means, free ends of said leg means adapted to be secured to one of the members to be connected together;
   receptacle means including said means having inclined means and bottom means, said side means and said bottom means adapted to be connected to another of the members to be connected together; said projection means adapted to be positioned in said receptacle means with said straight leg means in engagement against the other member, said inclined leg means in engagement with said inclined means and said bight means directed toward said bottom means; and
   means for extending between said bottom means and said bight means for drawing said projection means tightly into said receptacle means with said inclined leg means and said inclined means forcing said straight leg means tightly and frictionally against the other member.

2. A draw-tight connector means according to claim 1 wherein said side means includes opposed side members.

3. A draw-tight connector means according to claim 1 wherein said drawing means includes threaded nut means secured onto said bight means in alignment with a hole therethrough and bolt means extending through a hole in said bottom means.

4. A draw-tight connector means according to claim 1 wherein the members interconnected by said projection means and said receptacle means secured thereto are disposed substantially at right angles.

* * * * *